United States Patent
Kraus et al.

(10) Patent No.: US 6,898,457 B1
(45) Date of Patent: May 24, 2005

(54) METHOD FOR DETERMINING TEMPERATURE, RADIATION THERMOMETER WITH SEVERAL INFRARED SENSOR ELEMENTS

(75) Inventors: Bernhard Kraus, Braunfels (DE); Frank Beerwerth, Runkel-Ennerich (DE)

(73) Assignee: Braun GmbH, Kronberg im Taunus (DE)

(*) Notice: Subject to any disclaimer, the term of this patent is extended or adjusted under 35 U.S.C. 154(b) by 0 days.

(21) Appl. No.: 09/763,436
(22) PCT Filed: Aug. 26, 1999
(86) PCT No.: PCT/EP99/06262
§ 371 (c)(1), (2), (4) Date: Feb. 22, 2001
(87) PCT Pub. No.: WO00/16047
PCT Pub. Date: Mar. 23, 2000

(30) Foreign Application Priority Data

Sep. 16, 1998 (DE) .......................................... 198 42 402
Dec. 11, 1998 (DE) .......................................... 198 57 145

(51) Int. Cl.⁷ ................................................ A61B 6/00
(52) U.S. Cl. ........................................ 600/474; 600/549
(58) Field of Search ................................. 600/474, 549, 600/412, 473, 475, 424

(56) References Cited

U.S. PATENT DOCUMENTS

| | | | |
|---|---|---|---|
| 4,523,095 A | 6/1985 | Keller-Steinbach | |
| 5,169,235 A | 12/1992 | Tominaga et al. | |
| 5,368,038 A | * 11/1994 | Fraden | 600/474 |
| 6,081,741 A | * 6/2000 | Hollis | 600/424 |
| 6,371,925 B1 | * 4/2002 | Imai et al. | 600/549 |
| 6,522,912 B1 | * 2/2003 | Nakatani et al. | 600/474 |

FOREIGN PATENT DOCUMENTS

| | | |
|---|---|---|
| EP | 031/52983 | 6/1991 |
| EP | 96937521 | 11/1996 |
| EP | 07271986 | 3/1997 |
| JP | 06286505 | 11/1994 |
| JP | 08117622 | 5/1996 |
| WO | 93/00457 | 5/1993 |
| WO | 94/12509 | 10/1994 |

OTHER PUBLICATIONS

English Translation of the International Preliminary Examination Report corresponding to EPO Application No. PCT/EP99/06262 dated Dec. 21, 2000.

* cited by examiner

Primary Examiner—Eleni Mantis Mercader
(74) Attorney, Agent, or Firm—Morgan Lewis & Bockius LLP

(57) ABSTRACT

The invention is directed to a method for determining a temperature by means of a radiation thermometer with multiple infrared sensor elements detecting infrared radiation from different regions and delivering corresponding temperature signals, in particular to a method for taking a patient's temperature by means of an ear thermometer. The method of the present invention is based on the known fact that the tympanic membrane has a higher temperature than the ear canal. Hence part of the sensor elements, that is, those that view the tympanic membrane, will detect a higher temperature than the remaining sensor elements that view the ear canal. According to the present invention, for evaluation only the temperature signal of that sensor element is used that supplies the peak temperature value by comparison with the other sensor elements.

7 Claims, 1 Drawing Sheet

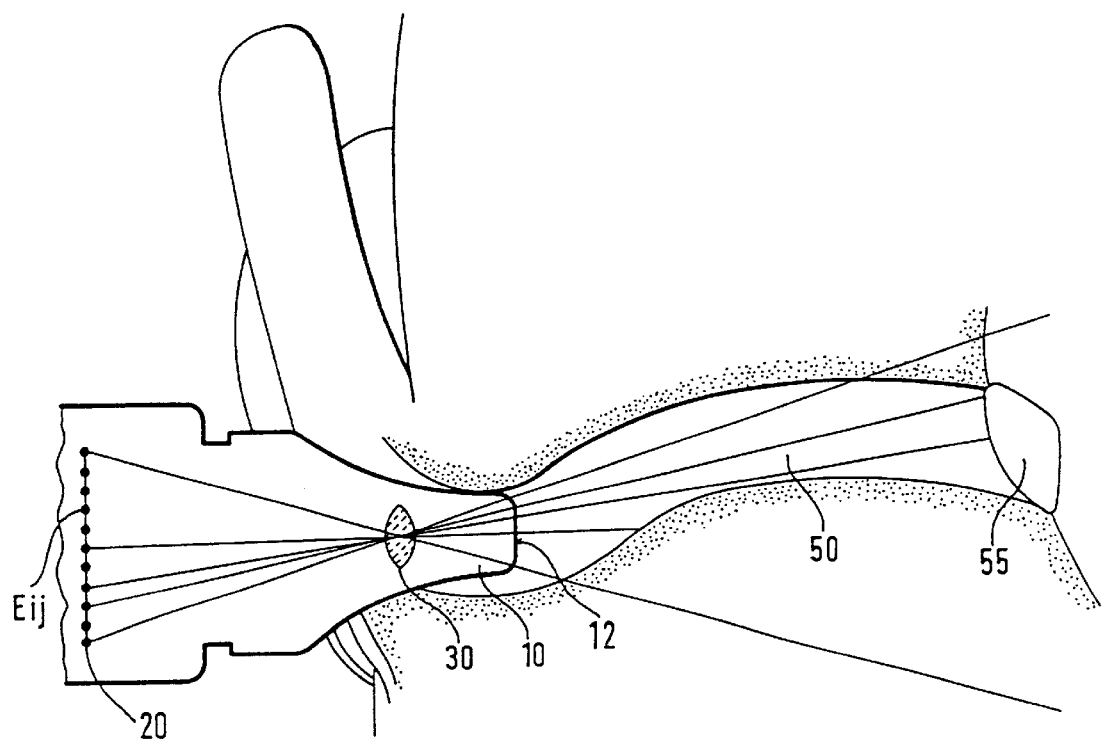

METHOD FOR DETERMINING TEMPERATURE, RADIATION THERMOMETER WITH SEVERAL INFRARED SENSOR ELEMENTS

BACKGROUND OF THE INVENTION

1. Field of the Invention

This invention relates to a method for determining a temperature by means of a radiation thermometer with multiple infrared sensor elements, and to a thermometer of this type.

2. Description of the Related Art

The art knows of radiation thermometers having just a single infrared sensor element disposed at a predetermined distance from the end of an optical waveguide. In consequence, radiation can impinge on the sensor element only from a predetermined, distance-dependent solid angle range. Thus, for instance, the probe head of an infrared thermometer designed to take a patient's temperature in the ear is dimensioned such that the sensor element exhibits a field of view only of the approximate size of the tympanic membrane. However, the field of view of the sensor element usually covers parts of both the tympanic membrane and the ear canal exhibiting differing temperatures. Generally, therefore, not the tympanic temperature is taken, which is considered as being representative of the true body core temperature, but rather an intermediate value that lies between the tympanic and the ear canal temperature. Hence the accuracy of a temperature reading depends on the placement of the probe head in the ear canal, that is, on its distance to the tympanic membrane and on the angle it forms with the ear canal.

From WO 95/14913 an ear thermometer is known in which multiple sensor elements are arranged at the end of an optical waveguide so as to receive radiation from different solid angle ranges. By corresponding evaluation of the signals supplied by the sensor elements, a temperature reading is obtained which, while being relatively independent of the placement of the probe head in the ear, is likewise representative of an intermediate value which does not correspond to the true tympanic temperature.

BRIEF SUMMARY OF THE INVENTION

It is an object of the present invention to provide a method for determining a temperature and a radiation thermometer of straightforward construction enabling selective measurement of the temperature of objects filling only part of the field of view of the radiation thermometer, in particular the temperature of the tympanic membrane.

The idea underlying the present invention is to use for temperature determination only the temperature signal of that particular infrared sensor element which corresponds to the highest/smallest temperature value by comparison with the remaining temperature signals. In this manner, for example, it is possible for an ear thermometer used for taking a patient's temperature to bypass the cooler regions lying in the field of view of the thermometer, meaning those regions that according to experience are to be associated with the ear canal. It will be appreciated, of course, that for other applications also the warmer regions may be bypassed.

Even when the tympanic membrane is completely outside the field of view of the thermometer, the peak temperature measured by a sensor element is a closer approximation to the tympanic temperature than a temperature averaged from all the measured temperatures or a mean temperature as would be measured by a conventional ear thermometer having only a single sensor element. Therefore, a resolution radiation thermometer, that is, a thermometer with multiple infrared sensor elements detecting infrared radiation from different regions and issuing corresponding temperature signals, provides also in this case more accurate readings than a conventional thermometer.

Hence when the method of the present invention is applied to the temperature determination in an ear thermometer, the geometric distribution of the temperature in the ear is taken into account by determining the relative, position of the tympanic membrane as the warmest region in the field of view of the thermometer, using only the sensor's peak signal for temperature determination. When the tympanic membrane occupies only a very small area in the thermometer's field of view, that is, when the number of higher level temperature signals, related to the aggregate of the temperature signals, drops below a predetermined threshold value, an evaluation unit advantageously issues a warning signal instructing the user to re-align the thermometer in the ear canal.

However, even a resolution thermometer will be unable to detect a region exhibiting an increased temperature if the ambient temperature is about as high as, or higher than, the body temperature, because then there is practically no longer any difference between the temperature of the ear canal and the temperature of the tympanic membrane. In this case, therefore, it would also be possible to determine the mean value of all the measured temperatures instead of the peak temperature. Hence it is necessary for the evaluation unit to take into account the ambient temperature before issuing the warning signal.

When the higher temperature values lie in the edge region of the field of view of the thermometer, advantageously a further signal may be output, in particular a signal indicating the direction in which a user should pivot the thermometer in the ear canal in order to better collect the infrared radiation emitted by the tympanic membrane.

BRIEF DESCRIPTION OF THE DRAWING

An embodiment of the present invention involving a method for determining a temperature as well as a radiation thermometer with multiple infrared sensor elements will be described in the following with reference to the accompanying drawing. Further embodiments are referred to in the description. The sole FIGURE shows schematically a probe head of an ear thermometer of the present invention.

DETAILED DESCRIPTION OF THE PREFERRED EMBODIMENTS

The method of the present invention will be described by way of example referring to an infrared ear thermometer in which a radiation sensor has individual sensor elements $E_{ij}$ arranged in a matrix pattern, the indices i and j denoting the row and the column, respectively, in which the respective sensor element is located. Each sensor element $E_{ij}$ issues a temperature signal $S_{ij}$ which corresponds to a temperature value $T_{ij}$.

In the method of the present invention, from the temperature values Tip the peak temperature value $T_{max}$ is output as the temperature measurement value T. Determination of the peak value can be accomplished both by means of analog circuitry including, for example, comparators or differentiators and a sample-and-hold circuitry, and by means of digital circuitry including, for example, A/D converters and suitable software.

The FIGURE shows schematically a probe head 10 of a radiation thermometer of the present invention in a position partially inserted into an ear canal 50 likewise schematically shown and having at its inner end a tympanic membrane 55. The probe head 10 includes an infrared sensor 20 comprised of multiple sensor elements Eij arranged in a matrix pattern. The probe head has at its tip a window 12 admitting infrared radiation to the interior of the probe head for impingement on the sensor 20. An optical system comprised of a lens 30 is arranged between the sensor 20 and the window 12. The lens 30 operates to produce on the sensor elements an image of the regions of the ear canal or tympanic membrane that lie in the field of view of the thermometer.

Suitable lenses of an infrared transparent material are made, for example, from polyethylene, silicon or zinc selenide. Particularly inexpensive are Fresnel lenses made from polyethylene. In the simplest case a single lens is sufficient. However, to obtain a large opening angle as deep as possible in the ear canal, lens systems of the type known from endoscopes are particularly advantageous. As optical system, suitably formed mirrors as, for example, gold plated concave mirrors, are also appropriate as a substitute for lenses. Furthermore, bundles of infrared radiation guiding fibers or reflector tubes are also possible.

To determine the peak temperature in the ear it is not necessary for the optical system to produce an image of the tympanic membrane and the inner ear canal on the infrared sensor; it is sufficient to project the field of view of the radiation thermometer on a one-dimensional array of sensor elements using suitably disposed optical elements as, for example, mirrors, prisms, tubes or fibers. In this case a two-dimensional image can be obtained by moving the thermometer in the ear canal.

Suitable devices for detecting infrared radiation generally include all known infrared detectors as, for example, thermopiles, bolometers, pyroelectric sensors or also semiconductor sensors.

During the evaluation of the measured temperature distribution in the ear, it is however also possible to obtain further information. When the measured temperature distribution deviates significantly from the normal distribution in the ear (warmer tympanic membrane and cooler ear canal), the user can be alerted to an operating error, for example.

Generally radiation sensors are not only responsive to radiation heat but also to heat transferred by convection or conduction. To avoid resultant measurement errors, it is possible, for example, to connect the sensor elements serially in pairs, one sensor element of each pair being then exposed to the radiation to be measured while the other sensor element is shielded to a greater or lesser degree. A corresponding sensor is described in DE 197 10 946.2. Alternatively, the optical system may be designed so that at least one sensor element, rather than viewing the object of measurement, meaning the ear, views a reference point, for example, a diaphragm, whose temperature is known, cf. EP 0 642 656 B1.

What is claimed is:

1. A method for determining a temperature by means of a radiation thermometer with multiple infrared sensor elements detecting infrared radiation from different regions and delivering corresponding temperature signals, in particular for taking a patient's temperature in the ear, in which for determining the temperature only the temperature signal of that particular sensor element is used which supplies the peak temperature value ($T_{max}$) by comparison with the remaining sensor elements, characterized in that a signal can be produced which indicates the direction in which a user is required to pivot the thermometer when the higher temperature values are measured in the edge region of the thermometer's field of view.

2. The method as claimed in claim 1, characterized in that a warning signal is produced when the number of higher temperature values, related to the aggregate of the temperature values supplied by the sensor elements, drops below a predetermined threshold value.

3. The method as claimed in claim 2, characterized in that the warning signal is not produced when the ambient temperature is within or exceeds the range of the body temperature.

4. A radiation thermometer, in particular for taking a patient's temperature in the ear, with multiple infrared sensor elements for the detection of infrared radiation from different regions, in which for determining the temperature only the temperature signal of that particular sensor element is used which supplies the peak temperature value ($T_{max}$) by comparison with the remaining sensor elements, characterized in that it includes an evaluation device for the temperature signals of the sensor elements, which can produce a signal indicating the direction in which a user is required to pivot the thermometer when the higher temperature values are measured in the edge region of the thermometer's field of view.

5. The radiation thermometer as claimed in claim 4, characterized in that it includes an optical system (30) comprising at least a lens, a mirror and/or multiple light guiding fibers or reflector tubes capable of directing infrared radiation from different regions to the individual sensor elements ($E_{ij}$).

6. The radiation thermometer as claimed in claim 4 or 5, characterized in that the sensor elements ($E_{ij}$) are arranged in a row or matrix pattern.

7. The radiation thermometer as claimed in claim 4, 6, or 5, characterized in that at least one sensor element is provided which is shielded against infrared radiation emitted by the object of measurement.

* * * * *